United States Patent [19]

Kutsuna

[11] Patent Number: 5,361,388
[45] Date of Patent: Nov. 1, 1994

[54] MESSAGE RELAYING SYSTEM FOR A DISTRIBUTED PROCESSING SYSTEM

[75] Inventor: Toshimasa Kutsuna, Aichi, Japan

[73] Assignee: NEC Corporation, Tokyo, Japan

[21] Appl. No.: 864,785

[22] Filed: Apr. 7, 1992

[30] Foreign Application Priority Data

Apr. 9, 1991 [JP] Japan .................. 3-075502

[51] Int. Cl.$^5$ ............... H04L 12/28; G06F 3/00
[52] U.S. Cl. ................ 395/275; 395/200; 364/DIG. 1; 364/229; 364/229.1; 364/228.2; 364/260.4; 364/260.9; 364/261; 364/261.2
[58] Field of Search ............. 370/60, 94.1, 110.1; 395/200, 275, 325; 364/200 MS File, 900 MS File

[56] References Cited

U.S. PATENT DOCUMENTS

| | | | |
|---|---|---|---|
| 4,188,662 | 2/1980 | Ishibashi | 395/400 |
| 4,228,504 | 10/1980 | Lewis et al. | 395/275 |
| 4,320,456 | 3/1982 | Heise et al. | 395/275 |
| 4,387,426 | 6/1983 | Roberts | 395/200 |
| 4,466,063 | 8/1984 | Segarra et al. | 395/200 |
| 4,485,439 | 11/1984 | Rothsein | 395/500 |
| 4,488,289 | 12/1984 | Turner | 370/60 |
| 4,710,868 | 12/1987 | Cocke et al. | 395/325 |
| 4,750,113 | 6/1988 | Buggert | 395/275 |
| 4,755,934 | 7/1988 | Inoue | 395/275 |
| 4,779,188 | 10/1988 | Gum et al. | 395/500 |
| 4,791,566 | 12/1988 | Sudama et al. | 395/200 |
| 4,799,215 | 1/1989 | Suzuki | 370/60 |
| 4,858,114 | 8/1989 | Heath et al. | 395/775 |
| 4,899,306 | 2/1990 | Greer | 395/500 |
| 5,063,494 | 12/1991 | Davidowski et al. | 395/800 |
| 5,165,020 | 11/1992 | Sudama et al. | 395/200 |
| 5,179,700 | 1/1993 | Aihara et al. | 395/650 |
| 5,185,742 | 2/1993 | Bales et al. | 370/110.1 |
| 5,185,860 | 2/1993 | Wu | 395/200 |
| 5,233,607 | 8/1993 | Barwig et al. | 370/94.1 |

OTHER PUBLICATIONS

Kitagawa, Nishida, "Introduction of Communications Between Hosts", Aug. 1989, p. 14.

*Primary Examiner*—Dale M. Shaw
*Assistant Examiner*—Lance Leonard Barry
*Attorney, Agent, or Firm*—Foley & Lardner

[57] ABSTRACT

A terminal identifier correspondence management table provides the management of logical terminal identifiers generated by a host computer and assigned to each logical terminal and corresponding terminal identifiers generated for each terminal by a distributed computer. A logical terminal identifier is assigned to each logical terminal and is used by an interactive processing unit operating on a host computer. A distributed computer assigns a terminal identifier to each terminal and adds a terminal identifier into each message received by the distributed computer from a terminal, and the host computer deletes the terminal identifier in each message received from the distributed computer. The host computer provides the pertinent message to the interactive processing unit as if it were received from the logical terminal indicated by the logical terminal identifier corresponding to the received terminal identifier. The host computer, in response to a transmission request from an interactive processing unit, adds the terminal identifier of the terminal corresponding to the logical terminal identifier into the message, as determined from the terminal identifier correspondence management table. The distributed computer determines the terminal on the basis of the terminal identifier in the message received from the host computer and deletes the terminal identifier from the message.

7 Claims, 4 Drawing Sheets

FIG. 2(a)

| | LOGICAL TERMINAL UNIT IDENTIFIER | TERMINAL UNIT IDENTIFIER |
|---|---|---|
| • | • • • • • • | • • • • • |
| • | • • • • • • | • • • • • |
| • | • • • • • • | • • • • • |
| • | | |
| • | | |

12 TERMINAL IDENTIFIER CORRESPONDENCE MANAGEMENT TABLE

FIG. 2(b)

| | LOGICAL TERMINAL UNIT IDENTIFIER | TERMINAL UNIT IDENTIFIER |
|---|---|---|
| INTER-ACTIVE PROCESSING SYSTEM | TERMINAL 1 | CRT0 1 |
| | TERMINAL 2 | CRT0 2 |
| | TERMINAL 3 | CRT0 3 |

12 TERMINAL IDENTIFIER CORRESPONDENCE MANAGEMENT TABLE

FIG. 2(c)

| | LOGICAL TERMINAL UNIT IDENTIFIER | TERMINAL UNIT IDENTIFIER |
|---|---|---|
| INTER-ACTIVE PROCESSING SYSTEM | TERMINAL 1 | CRT0 1 |
| | TERMINAL 2 | CRT0 2 |
| | TERMINAL 3 | CRT0 3 |

12-1 TERMINAL IDENTIFIER CORRESPONDENCE MANAGEMENT TABLE

MESSAGE RELAYING SYSTEM FOR A DISTRIBUTED PROCESSING SYSTEM

BACKGROUND OF THE INVENTION

The present invention relates to a system for relaying messages transmitted in a distributed processing system, between interactive processing units operating on a host computer and terminals, and more particularly to a system for relaying messages between the host computer and a distributed computer.

PRIOR ART

In a message relaying system of this kind according to the prior art, to eliminate the need for the host computer and the distributed computer to be aware of the connection of a distributed computer to the host computer, the host computer performs its system generation as if terminals were directly connected to it even though the distributed computer is directly connected to the host computer. In a conventional message relaying system, a host computer can establish a logical connection only with terminals or other host computers which are defined in system generation.

Since such a host computer cannot establish a logical connection with a distributed computer, however, the host computer must perform its system generation by regarding the distributed computer as a terminal. In this case, such a distributed computer is called a virtual terminal. Since the distributed computer operates as if it were a real terminal, the host computer can establish a logical connection with the distributed computer as well as with the real terminal. Likewise, the distributed computer establishes a logical connection with the host computer during the system generation by regarding the host computer as a real terminal.

Therefore the distributed computer performs its own system generation as if terminals were also connected together with it to the host computer. Thus as many logical communication paths as terminals are provided between the host computer and the distributed computer, and relaying of messages is accomplished using those logical communication paths.

The conventional message relaying system referred to above has the disadvantage that, because as many logical communication paths as terminals need to be provided between the host computer and the distributed computer, a virtual terminal should be provided between the host computer and the distributed computer and be defined in system generation by both the host and the distributed computers. There also is the further disadvantage that, if any terminal is additionally provided, an addition should be made to the definition of the virtual terminal.

SUMMARY OF THE INVENTION

Accordingly, it is one object of the present invention to dispense with the virtual terminal unit otherwise required between the host and distributed computer connected to them.

According to the present invention, there is provided a message relaying system for a distributed processing system provided with a plurality of terminals, a distributed computer connected to the terminals by a first set of communication lines and a plurality of host computers connected to the distributed computer by a second set of communication lines, wherein the terminals relay messages to and from the distributed computer to perform interactive processing with the host computers.

The message relay system is further comprised of a terminal identifier correspondence management table for managing logical terminal identifiers. A logical terminal identifier is provided for each logical terminal for use by the interactive processing unit operating on each host computer. Terminal identifiers, one provided for each of the terminals, correspond with the logical terminal identifiers. The terminal identifiers are provided in system generation by the distributed computer and can be sent in a message to the host computers.

A terminal identifier adding means is provided in the distributed computer for adding into a message received by the distributed computer from one of the terminals, the terminal identifier of the terminal, determined from a communication control table formulated in system generation by the distributed computer.

A terminal identifier deleting means is provided in each host computer for deleting the terminal identifier in a message received from the distributed computer. The message is then provided to the interactive processing unit as if the message were received from the logical terminal indicated by the logical terminal identifier corresponding to the pertinent terminal identifier found in the terminal identifier correspondence management table.

A terminal identifier adding means in the host computer, at a transmit request, finds the terminal identifier of the logical terminal from the terminal identifier correspondence management table corresponding to the logical terminal identifier received from the interactive processing unit, and adds the terminal identifier into the message.

A terminal identifier deleting means is provided in the distributed computer for finding, in the communication control table, based on the terminal identifier in a message received by the distributed computer from the host computer, the terminal to which the message is to be sent, and at the same time deleting the terminal identifier in the message.

BRIEF DESCRIPTION OF THE DRAWINGS

Other features of the present invention will become more apparent from the following detailed description when taken in conjunction with the accompanying drawings wherein:

FIGS. 2(a)–2(c) show further details of the terminal identifier correspondence management tables 12 and 12-1 shown in FIG. 1.

DETAILED DESCRIPTION OF THE PREFERRED EMBODIMENTS

Each host computer generates the logical terminal identifiers for logical terminals during the system generation, independently, on the basis of a job control statement described in a job control language (JCL) provided to the host computer by an operator. The host computer can obtain real terminal identifiers generated by the distributed computer by receiving a message from the distributed computer.

Figure 1:
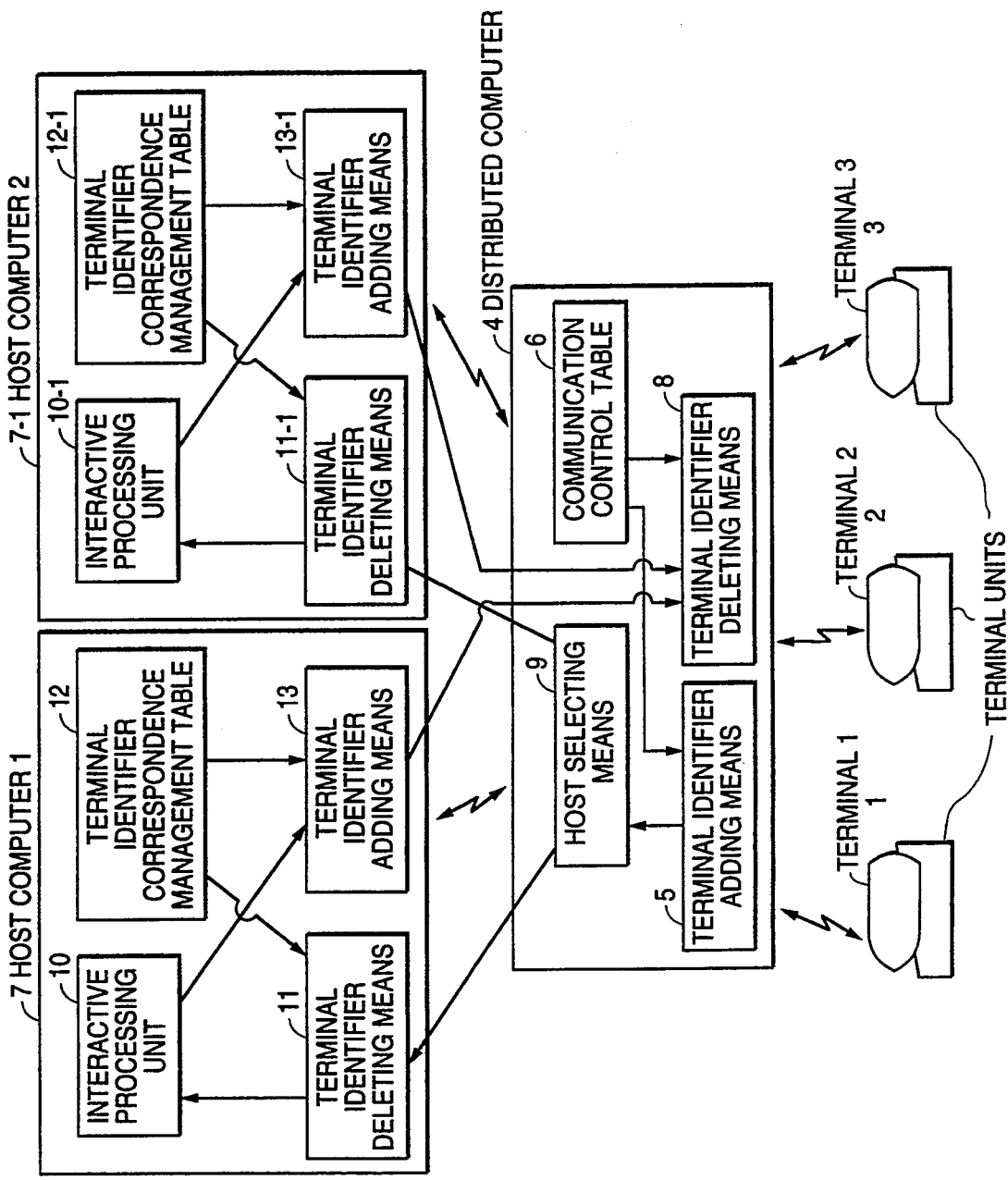
FIG. 1 is a block diagram illustrating the components of one preferred embodiment of the invention.

Referring to FIG. 1, one preferred embodiment of the present invention is provided with terminals 1, 2 and 3, a distributed computer 4, and host computers 7 and 7-1.

A communication control table 6 is formulated system generation by the distributed computer 4. Terminal identifier adding means 5 adds a terminal identifier to a message received by the distributed computer 4 from a terminal (1, 2, or 3). Terminal identifier deleting means 8 deletes a terminal identifier in a message received by the distributed computer 4 from a host computer 7 or 7-1. Terminal identifier adding means 5 and deleting means 8 are preferably implemented using conventional software techniques. Host selecting means 9 determines which host computer, 7 or 7-1, should be sent a message received from a terminal.

An interactive processing unit 10 operates in a host computer. Terminal identifier deleting means 11 deletes a terminal identifier in a message received by the host computer 7 from the distributed computer 4. A terminal identifier correspondence management table 12 manages the correspondence between the logical terminal identifiers of logical terminals used by interactive processing unit 10 and the terminal identifiers. Terminal identifier adding means 13 adds in the host computer 7, a terminal identifier to a message to be sent to the distributed computer 4.

An interactive processing unit 10-1, terminal identifier deleting means 11-1, a terminal identifier correspondence management table 12-1 and terminal identifier adding means 13-1 perform respectively the same functions, in the host computer 7-1, as the corresponding constituent elements of the host computer 7.

Although only two host computers and three terminals are represented in FIG. 1, it is possible to have three or more host computers and/or four or more terminals.

FIG. 2(a) is a diagram illustrating an example of the structure of a terminal identifier correspondence management table 12.

FIGS. 2(b) and 2(c) show examples of terminal identifier correspondence management tables 12 and 12-1 when the terminal identifiers of the terminals 1, 2 and 3 are CRTO 1, CRTO 2 and CRTO 3, respectively. In the example of FIG. 2(b), the logical terminal identifiers 14 of the logical terminals used by the interactive processing unit 10 are TERMINALs 1 through 3, respectively. The logical terminal identifiers 15 of the logical terminals used by the interactive processing unit 10-1 are TERMINALs 1 through 3, respectively, as shown in FIG. 2(c).

Next will be described in detail the operation of this preferred embodiment.

When the interactive processing unit 10 is actuated for processing a message inputted from a terminal, the terminal identifier correspondence management table 12 is prepared by job management. Table 12 is created based on the job control statement described in the JCL provided during system generation and is not changed thereafter. The terminal identifiers are stored in a predetermined storage in a main memory or in peripheral equipment. When the interactive processing unit 10-1 is actuated, the terminal identifier correspondence management table 12-1 is prepared.

The distributed computer 4, upon receiving a message transmitted by terminal 1, obtains CRTO 1, the terminal identifier of the terminal 1, from the communication control table 6 with the terminal identifier adding means 5. The adding means 5 then adds the terminal identifier to the message and the host selecting means 9 selects the host computer 7 and the transmits the message to the host computer 7. This description does not cover details of the host selecting means 9 which are unnecessary for an understanding of the invention.

Upon receiving the message transmitted by the distributed computer 4, the host computer 7, with its terminal identifier deleting means 11, searches the terminal identifier correspondence management table 12 for CRTO 1, which is the terminal identifier in the message, and finds TERMINAL 1, which is a logical terminal identifier that corresponds to the terminal identifier CRTO 1. After that, the deleting means 11 deletes the terminal identifier from the message, and provides the message and the logical terminal identifier obtained by referring to table 12, to the interactive processing unit 10 as if it were received from the logical terminal identified by TERMINAL 1. As a result, processing unit 10 knows that it has received the message from the logical terminal corresponding to the logical terminal identifier TERMINAL 1 and processes the message. At a request from the interactive processing unit 10 to transmit a message to the logical terminal, identified by the logical terminal identifier TERMINAL 1, the host computer 7, with its terminal identifier adding means 13, searches the terminal identifier correspondence management table 12 using the logical terminal identifier TERMINAL 1, and finds the corresponding terminal identifier CRTO 1. Then adding means 13 adds the terminal identifier CRTO 1 to the message, and transmits the message to distributed computer 4.

Upon receiving the message transmitted by host computer 7, distributed computer 4, with its terminal identifier deleting means 8, finds the destination terminal, terminal 1 in the communication control table 6 which corresponds to the terminal identifier CRTO 1. After that, deleting means 8 deletes the terminal identifier CRTO 1 from the message, and transmits the message to the terminal 1.

Similarly, upon receiving a message transmitted by the terminal 2, the distributed computer 4, finds CRTO 2, which is the terminal identifier that corresponds to the terminal 2, from the communication control table 6. With the terminal identifier adding means 5, distributed computer 4 adds terminal identifier CRTO 2 to the message, selects the host computer 7-1 with the host selecting means 9 and transmits the message to the host computer 7-1.

Upon receiving the message transmitted by the distributed computer 4, the host computer 7-1, with its terminal identifier deleting means 11-1, searches the terminal identifier correspondence management table 12-1 using the terminal identifier CRTO 2, to find the corresponding logical terminal identifier TERMINAL 2. After that, deleting means 11-1 deletes the terminal identifier CRTO 2 from the message, and provides the message to the interactive processing unit 10-1 as if it were received from the logical terminal identified by TERMINAL 2.

At a request from the interactive processing unit 10-1 to transmit a message to the logical terminal identified by logical terminal identifier TERMINAL 2, the host computer 7-1, with its terminal identifier adding means 13-1, searches the terminal identifier correspondence management table 12-1 using the logical terminal identifier TERMINAL 2, and finds the corresponding terminal identifier CRTO 2. Then adding means 13-1 adds the terminal identifier CRTO 2 into the message, and transmits the message to distributed computer 4.

Upon receiving the message transmitted by the host computer 7-1, the distributed computer 4, with its terminal identifier deleting means 8, finds the terminal 2 from the communication control table 6 which corresponds to the terminal identifier CRTO 2 in the message. After that, deleting means 8 deletes the terminal identifier CRTO 2 from the message, and transmits the message to the terminal 2.

Figure 3A:
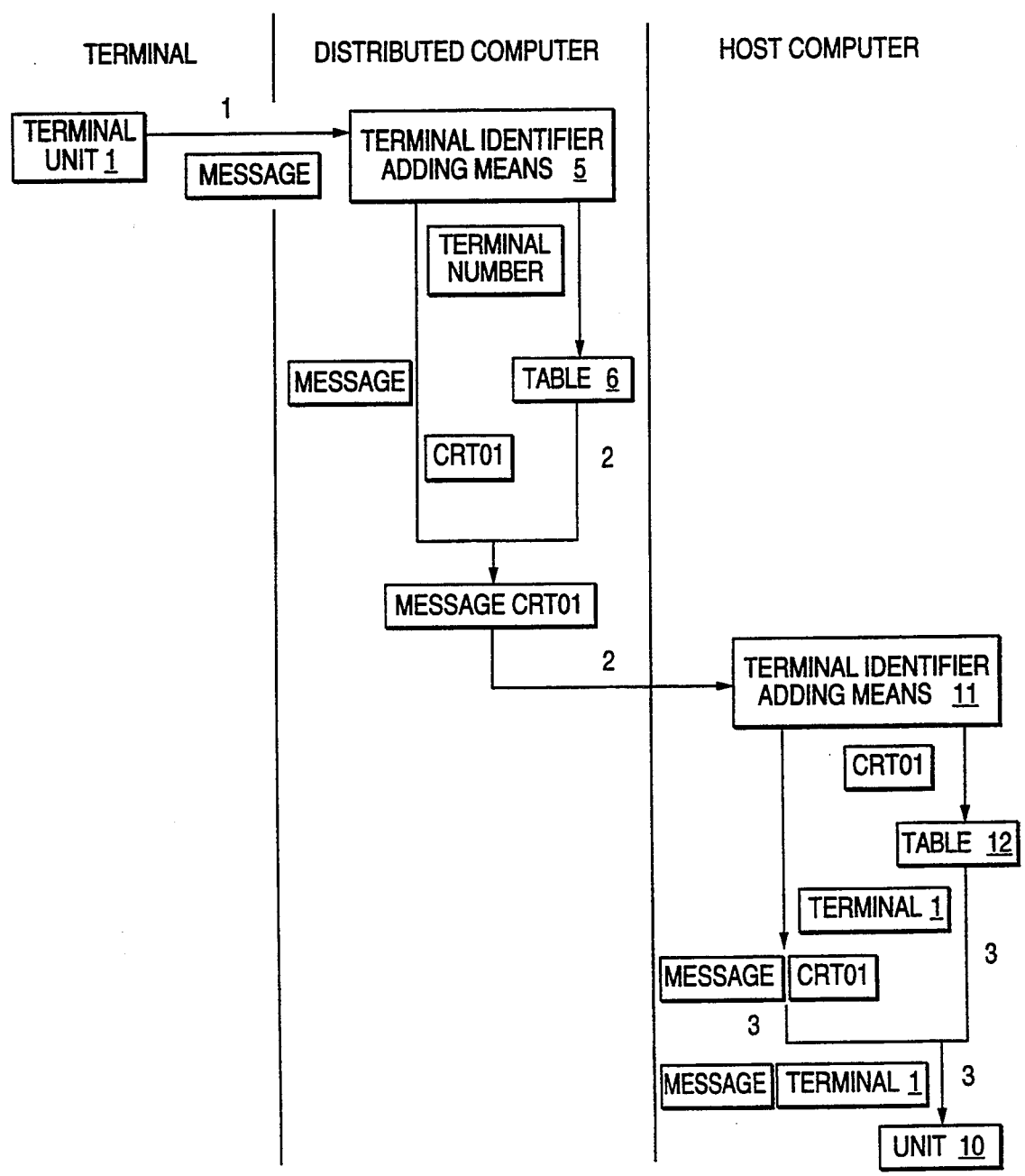
FIG. 3(a) is a flow diagram of a typical message transfer between a terminal and a host computer according to the present invention.

Another message transmitting example will be described referring to FIGS. 3(a) and 3(b). A message transfer from a terminal unit to a processing unit as shown in FIG. 3(a) is as follows:

1. The terminal unit 1 transmits the message to the distributed computer 4.
2. The terminal identifier adding means 5 searches the terminal identifier of the terminal unit 1 from the communication control table 6, and adds the terminal identifier CRTO 1 thus obtained to the message received from the terminal unit 1 to send to the host computer 7.
3. The terminal identifier deleting means 11 refers to the terminal identifier correspondence management table 12 for the logical terminal identifier TERMINAL 1 corresponding to the terminal identifier CRTO 1, and deletes the terminal identifier CRTO 1 from the message. The means 11 sends the message and the identifier TERMINAL 1 to the unit 10.

Figure 3B:
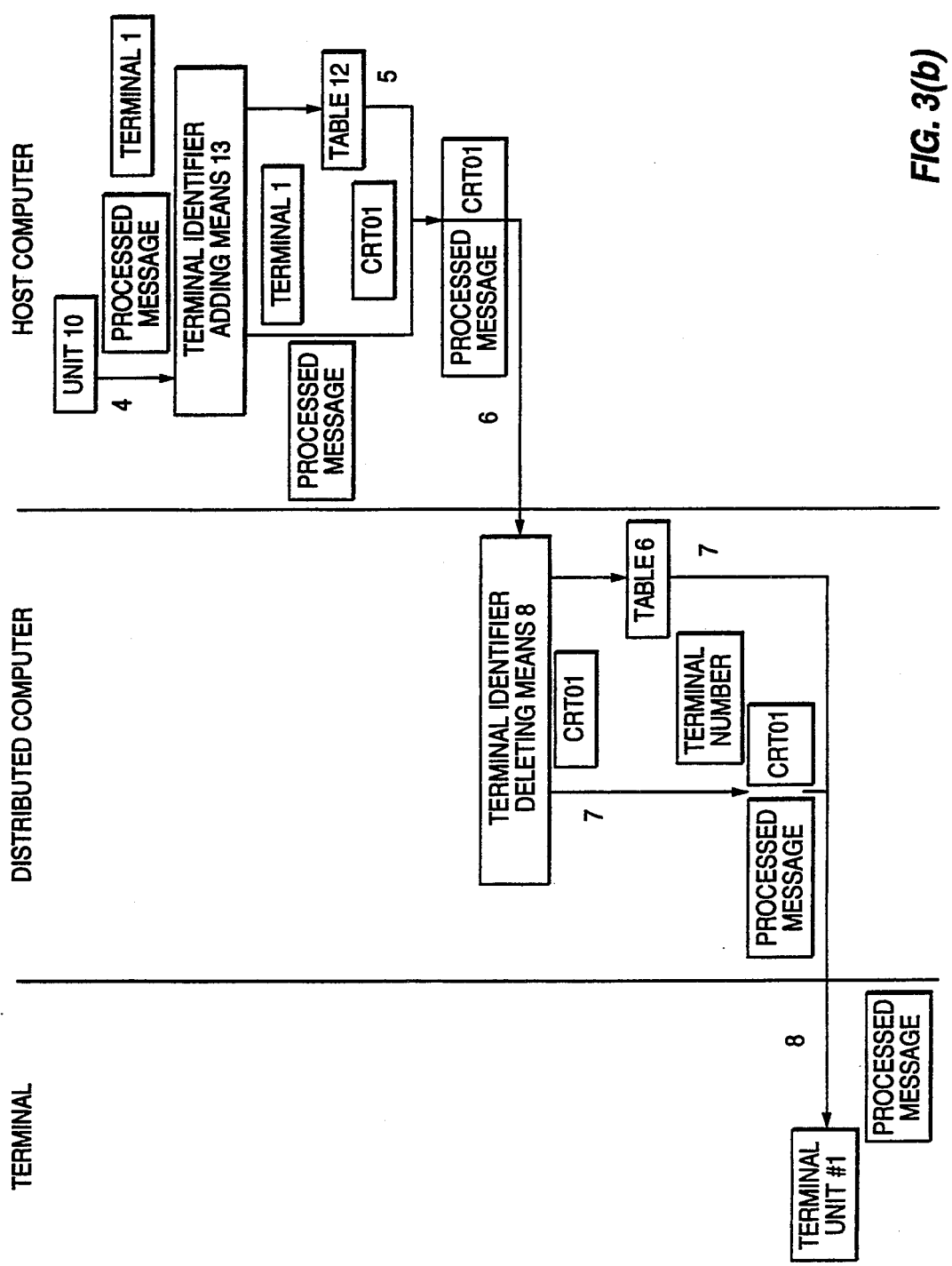
FIG. 3(b) is a flow diagram of a typical message transfer between a host computer and a terminal according to the present invention.

A message transfer from a processing unit to a terminal as shown in FIG. 3(b) is as follows:

4. The interactive processing unit 10 processes a message and sends the processed message to the means 13.
5. The terminal identifier adding means 13 refers to the terminal identifier correspondence management table 12 for the terminal identifier CRTO 1 corresponding to the logical terminal identifier TERMINAL 1.
6. The terminal identifier adding means 13 adds the terminal identifier CRTO 1 to the processed message to send to the means 8 in the distributed computer 4.
7. The terminal identifier deleting means 8 searches for the terminal number corresponding to the identifier CRTO 1 in the communication control table 6, and deletes the terminal identifier CRTO 1 from the processed message.
8. The distributed computer 4 transmits the processed message to the terminal unit 1 corresponding to the terminal number.

Although the previous examples provided for a correspondence between terminal identifier CRTO 1, and logical terminal identifier TERMINAL 1, CRTO 2 and TERMINAL 2, etc., the more general case is for the terminal identifier to be CRTO X and the logical terminal identifier be TERMINAL Y where there is no required relationship between X and Y.

As hitherto described, the present invention provides the benefit of dispensing with the otherwise required virtual terminal unit between the host and distributed computers by having a terminal identifier handed over in communication between the host and distributed computers and unifying the otherwise plural logical paths between each host computer and the virtual terminal unit into a single logical path between the host and distributed computers.

What is claimed is:

1. An apparatus for relaying messages in a distributed processing system containing a plurality of terminals, a distributed computer connected to said terminals by a first set of communication lines, a plurality of host computers connected to said distributed computer by a second set of communication lines, wherein said terminals relay messages to and from said distributed computer to perform interactive processing with said host computers, said apparatus comprising:

an interactive processing unit operating in each of said host computers;

a terminal identifier correspondence management table in each of said host computers, for managing logical terminal identifiers and corresponding terminal identifiers, said logical terminal identifiers for use by said interactive processing unit;

a communication control table in said distributed computer containing terminal identifiers corresponding to each of said terminals;

first terminal identifier adding means in said distributed computer, connected to said communication control table and communicatively connected to each of said terminals, for adding said terminal identifier corresponding to said terminal found in said communication control table into a message received by said distributed computer from one of said terminals, and sending said message to one of said host computers, said first terminal identifier adding means extracting a logical terminal identifier contained in said message and determining said terminal identifier by finding said terminal identifier corresponding to said logical terminal identifier from said communication control table;

first terminal identifier deleting means in each of said host computers, connected to said interactive processing unit and said terminal identifier correspondence management table and communicatively connected to said distributed computer, for deleting said terminal identifier from a message received by one of said host computers from said distributed computer, and providing said message to said interactive processing unit as if the message were received from the logical terminal indicated by the logical terminal identifier corresponding to the terminal identifier found in said terminal identifier correspondence management table;

second terminal identifier adding means in each of said host computers, connected to said interactive processing unit and said terminal identifier correspondence management table and used in transmit requests sent to said distributed computer, for determining the terminal identifier of a destination terminal for a message, from said terminal identifier correspondence management table, using said logical terminal identifier from said interactive processing unit, and adding said terminal identifier into said message; and second terminal identifier deleting means in said distributed computer, connected to said communication control table and communicatively connected to each of said host computers and communicatively connected to each of said terminals, for finding, on the basis of a terminal identifier in a message received by said distributed computer from one of said host computers, said destination terminal from said communication control table and deleting said terminal identifier from said message and sending said message to said destination terminal.

2. An apparatus for relaying messages as claimed in claim 1 wherein a unique logical terminal identifier is provided for each logical terminal.

3. An apparatus for relaying messages as claimed in claim 1 wherein a unique terminal identifier is provided for each of said terminals.

4. An apparatus for relaying messages as claimed in claim 1 wherein said logical terminal identifiers and said terminal identifiers are provided by said host computers and said distributed computer respectively.

5. An apparatus for relaying messages as claimed in claim 1 wherein said communication control table is formulated by said distributed computer.

6. A method for relaying messages in a distributed processing system containing a plurality of terminals, a distributed computer connected to said terminals by a first set of communication lines, a plurality of host computers, each of said host computers containing an interactive processing unit, said host computers connected to said distributed computer by a second set of communication lines, wherein said terminals relay messages to and from said distributed computer to perform interactive processing with said host computers, comprising the steps of:

generating a communication control table in said distributed computer containing terminals identifiers corresponding to said terminals;

generating a correspondence management table in each of said host computers, containing logical terminal identifiers and corresponding said terminal identifiers, said logical terminal identifiers for use by said interactive processing unit;

adding said terminal identifier corresponding to one of said terminals, into each message received by said distributed computer from one of said terminals, as determined by said logical terminal identifier contained in said message and said correspondence management table used to equate said logical terminal identifier to said terminal identifier;

deleting said terminal identifier from each message received by one of said host computers from said distributed computer;

providing said message received by said one of said host computers to said interactive processing unit as if the message were received from the logical terminal indicated by the logical terminal identifier corresponding to the terminal identifier found in said terminal identifier correspondence management table;

determining the terminal identifier of a destination terminal for a message from said terminal identifier correspondence management table, said terminal identifier corresponding to said logical terminal identifier received from said interactive processing unit;

adding said terminal identifier corresponding to said logical terminal identifier received from said interactive processing unit into said message;

sending said message to the distributed computer;

determining, on the basis of said terminal identifier in a message received by said distributed computer from one of said host computers, a destination terminal from said communication control table; and deleting said terminal identifier from said message and sending said message to said destination terminal.

7. A distributed processing system, including a plurality of terminals, comprising:

a distributed computer communicatively connected to a plurality of host computers, said distributed computer including:

a communication control table containing terminal identifiers corresponding to each of said terminals;

first terminal identifier adding means connected to said communication control table and communicatively connected to each of said terminals, for adding said terminal identifier corresponding to said terminal found in said communication control table into a message received by said distributed computer from one of said terminals, and sending said message to a host selecting means, said first terminal identifier adding means extracting a logical terminal identifier contained in said message and determining said terminal identifier by finding said terminal identifier corresponding to said logical terminal identifier from said communication control table;

said host selecting means connected to said first terminal identifier adding means and communicatively connected to each of said host computers, for selecting one of said host computers to process said message received from said first terminal identifier adding means, second terminal identifier deleting means connected to said communication control table and communicatively connected to each of said plurality of said host computers and communicatively connected to each of said terminals for finding, on the basis of a terminal identifier in a message received by said distributed computer from one of said plurality of said host computers, said destination terminal from said communication control table and deleting said terminal identifier from said message and sending said message to said destination terminal, and wherein each of said host computers, communicatively connected to said distributed computer, includes:

an interactive processing unit;

a terminal identifier correspondence management table for managing logical terminal identifiers and corresponding terminal identifiers, said logical terminal identifiers for use by said interactive processing unit;

second terminal identifier adding means connected to said interactive processing unit and said terminal identifier correspondence management table and communicatively connected to said distributed computer, used in transmit requests sent to said distributed computer, for determining the terminal identifier of a destination terminal for a message, from said terminal identifier correspondence management table, using said logical terminal identifier from said interactive processing unit, and adding said terminal identifier into said message; and first terminal identifier deleting means connected to said interactive processing unit and said terminal identifier correspondence management table and communicatively connected to said distributed computer, for deleting said terminal identifier from a message received by one of said plurality of host computers from said distributed computer, and providing said message to said interactive processing unit as if the message were received from the logical terminal indicated by the logical terminal identifier corresponding to the terminal identifier found in said terminal identifier correspondence management table.

* * * * *